(12) United States Patent
Kapoor et al.

(10) Patent No.: US 10,726,040 B2
(45) Date of Patent: Jul. 28, 2020

(54) LOSSLESS CONVERSION OF DATABASE TABLES BETWEEN FORMATS

(71) Applicant: SAP SE, Walldorf (DE)

(72) Inventors: Aditya Kapoor, Gurgaon (IN); Manish Kumar Sinha, New Delhi (IN); Vipul Khullar, New Delhi (IN)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 15/914,526

(22) Filed: Mar. 7, 2018

(65) Prior Publication Data

US 2019/0278862 A1   Sep. 12, 2019

(51) Int. Cl.
*G06F 16/00* (2019.01)
*G06F 16/25* (2019.01)
*G06F 16/22* (2019.01)
*G06F 16/23* (2019.01)

(52) U.S. Cl.
CPC ........ *G06F 16/258* (2019.01); *G06F 16/2282* (2019.01); *G06F 16/2379* (2019.01)

(58) Field of Classification Search
CPC .................................................... G06F 16/258
See application file for complete search history.

(56) References Cited

PUBLICATIONS

"Addons for SAP ERP background info," retrieved from www.software4production.de/en/page/sap-erp-r-3 on or before Mar. 2018, 1 p.

"Append Structures", retrieved from https://help.sap.com/saphelp_nw73/helpdata/en/cf/21eb61446011d189700000e8322d00/frameset.htm on or before Mar. 2018, 1 p.

"Append Views", retrieved from https://help.sap.com/doc/abapdocu_750_index_htm/7.50/en-US/abenddic_append_views.htm on or before Mar. 2018, 1 p.

"Columnar and Row-Based Data Storage", retrieved from https://help.sap.com/viewer/6b94445c94ae495c83a19646e7c3fd56/2.0.01/en-US/bd2e9b88bb571014b5b7a628fca2a132.html on or before Mar. 2018, 3 pp.

"Create Vs Convert to Runtime Data Dictionary—when and why?", retrieved from https://fullonbaan.wordpress.com/2012/03/28/create-vs-convert-to-runtime-data-dictionary-when-and-why/ on or before Mar. 2018, 6 pp.

"Data Dictionary—FAQs", retrieved from https://wiki.scn.sap.com/wiki/display/ABAP/Data+Dictionary+-+FAQs on or before Mar. 2018, 4 pp.

Densborn, F., "How do you Migrate to SAP S/4HANA", retrieved from https://blogs.sap.com/2016/06/21/how-to-migrate-to-sap-s4hana/ on or before Mar. 2018, 6 pp.

(Continued)

*Primary Examiner* — Ajith Jacob
(74) *Attorney, Agent, or Firm* — Klarquist Sparkman, LLP

(57) ABSTRACT

Techniques and solutions are described for facilitating the conversion of tables, having primary data and an append specifying a format of append data, from a first format to a second format. A runtime object and a data dictionary entry can be created for a primary table in the second format, and at least a portion of primary data transferred to the primary table in the second format. A database layer object corresponding to the first table in the first format can be associated with a temporary runtime object and a temporary data dictionary entry so that append data can be transferred to an append table in the second format. Operations directed to the primary table in the second format can be modified to also be directed to the append table, such as using a JOIN view.

20 Claims, 17 Drawing Sheets

| AA | BB | CC | DD | EE | Extension_Field_1 | Extension_Field_2 | Extension_Field_3 | Extension_Field_4 |
|---|---|---|---|---|---|---|---|---|
| 5 | 1 | AC3P | 1001 | T | LO_001 | X | 25 | XWZ |
| 5 | 2 | AC3S | 1002 | T | LO_002 |   | 30 | ABC |

(56) References Cited

PUBLICATIONS

Dinh, D., "How to convert a rowstore table to columnstore table?", retrieved from https://technologyinsightscoffee.wordpress.com/2017/02/22/how-to-convert-a-rowstore-table-to-columnstore-table/ on or before Mar. 2018, 3 pp.

Falk, N., "SAP HANA Security Part 1: The Difference Between Run-Time and Design-Time Roles", retrieved from https://sapexperts.wispubs.com/BI/Articles/SAP-HANA-Security-Part-l-The-Difference-Between-Run-Time-and-Design-Time-Roles?id=6D25DDD3E481456EB8489B263669974D#.WpXUPnxG2po on or before Mar. 2018, 2 pp.

"How to convert from Row Store to Column Store Table?", retrieved from https://www.openlinksw.com/vos/main/Main/VirtTipsAndTricksRowToColStoreConversion on or before Mar. 2018, 2 pp.

"Inconstistencies between database object and runtime object", retrieved from https://archive.sap.com/discussions/thread/117275 on or before Mar. 2018, 7 pp.

Maruskin, M.,"BW: Conversion of DB tables to from Row Store to Column Store", retrieved from http://blog.maruskin.eu/2017/01/bw-conversion-of-db-tables-to-from-row.html on or before Mar. 2018, 5 pp.

Sedhorn, P., "What is the difference between internal table and Database table ?", retrieved from https://www.bayt.com/en/specialties/q/295239/what-is-the-difference-between-internal-table-and-database-table/ on or before Mar. 2018, 6 pp.

Song, J., "What is runtime object? Where are the runtime objects stored?", retrieved from https://wiki.scn.sap.com/wiki/pages/viewpage.action?pageId=462057071 on or before Mar. 2018, 2 pp.

Weiss, W., et al., "SAP S/4HANA Extensibility—Porting ABAP add-ons to SAP Cloud Platform", PowerPoint presentation retrieved from https://www.sapappsdevelopmentpartnercenter.com/cdn/138/16759_22466.pdf on or before Mar. 2018, 45 pp.

"What is data dictionary?", retrieved from https://archive.sap.com/discussions/thread/730196 on or before Mar. 2018, 15 pp.

"What is database object? Where are the database objects stored?", retrieved from https://wiki.scn.sap.com/wiki/pages/viewpage.action?pageId=462057079 on or before Mar. 2018, 3 pp.

"What is the difference between .APPEND @ .INCLUDE", retrieved from https://archive.sap.com/discussions/thread/682190 on or before Mar. 2018, 6 pp.

Table 1 – Version 2 908

Fields 912
AA
BB
CC ← 112
DD
EE

Append Table 916

Fields
AA — 140
BB — 140
/path/extension_field_1
/path/extension_field_2 ← 920
/path/extension_field_3
/path/extension_field_4 — 136

914 ↙

| AA | BB | CC | DD | EE |
|----|----|------|------|----|
| 5 | 1 | AC3P | 1001 | T |
| 5 | 2 | AC3S | 1002 | T |

924 ↙

| AA | BB | Extension_Field_1 | Extension_Field_2 | Extension_Field_3 | Extension_Field_4 |
|----|----|-------------------|-------------------|-------------------|-------------------|
| 5 | 1 | LO_001 | X | 25 | XWZ |
| 5 | 2 | LO_002 |  | 30 | ABC |

FIG. 9

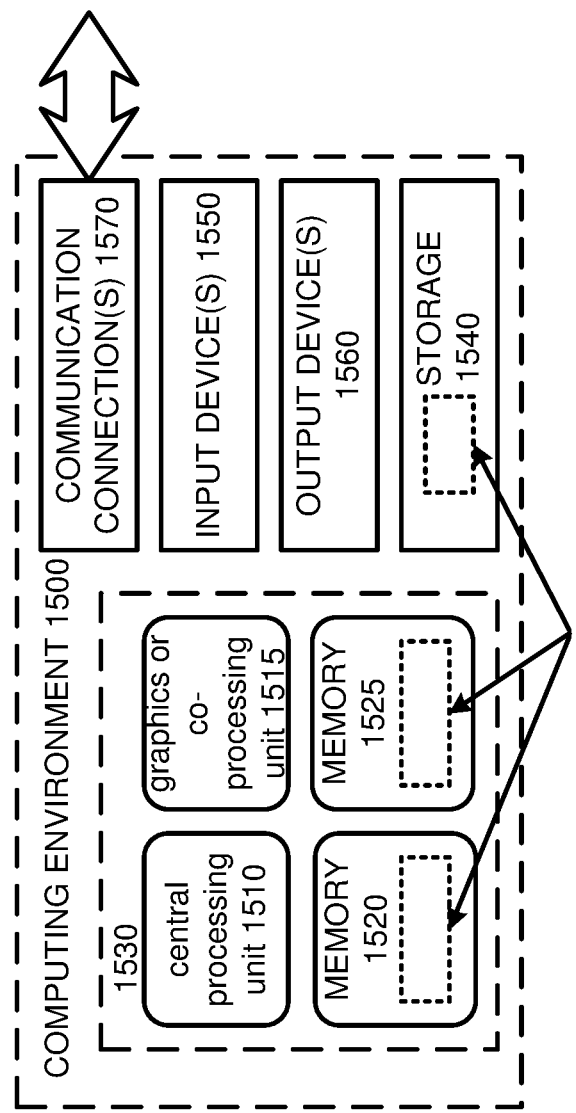

US 10,726,040 B2

LOSSLESS CONVERSION OF DATABASE TABLES BETWEEN FORMATS

FIELD

The present disclosure generally relates to managing changes to database tables. Particular implementations relate to preserving extensions or customizations to tables when a standard table is converted to a new format.

BACKGROUND

Software commonly is updated or upgraded over time. In some cases, changes are incremental, such that data used with an earlier version of a software application continues to be useable with a later, updated version of the software application. In other cases, changes to the application are significant enough that all or a portion of data for a prior version of the application is not useable with the later, updated version of the software application. Similar issues can arise when data is to be transitioned between different software applications, which may use data in different formats.

In some cases, a software vendor may create tools, such as a migration assistant or wizard, to convert data for use with a new or different software application. However, these tools are typically created for general use. If data differs from a standard, expected format, the data may be lost when the data is transferred. Or, even if the data is not lost, it may not be converted to the new format. If it is recognized that some data was not converted, it can be time consuming to manually convert the data into a new format. In addition, it may be time consuming to adapt a new software application to work with data that is not native to the application or converted using a migration assistant. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the conversion of tables, having primary data and an append specifying a format of append data, from a first format to a second format. A runtime object and a data dictionary entry can be created for a primary table in the second format, and at least a portion of primary data transferred to the primary table in the second format. A database layer object corresponding to the first table in the first format can be associated with a temporary runtime object and a temporary data dictionary entry so that append data can be transferred to an append table in the second format. Operations directed to the primary table in the second format can be modified to also be directed to the append table, such as using a JOIN view.

In one aspect, a method is provided for converting a table having primary data and append data from a first format to a second format. A request is received to convert at least a first table from a first format to a second format. The at least a first table in the first format includes primary data and append data. The at least a first table in the second format includes at least a portion of the primary data. One or more temporary database objects including the append data are created. At least a first primary database table is created in the second format. At least a portion of the primary data is copied to the at least a first primary database table. At least a first append database table is created, in the second format. At least a portion of the append data is copied to the at least a first append database table. The one or more temporary database objects are deleted.

In another aspect, another disclosed method provides for converting a table having primary data and append data from a first format to a second format. A first table is loaded into an update runtime environment. The first table has an associated object in a database layer and an entry in a data dictionary. The first table includes primary data and append data. The append data is associated with an entry in the data dictionary.

At least a portion of primary data from the first table is converted to a second format. Data in the second format is stored in a runtime object for a second table. The second table is associated with an entry in the data dictionary. A temporary runtime object and a temporary data dictionary entry for the temporary runtime object are created. The database layer object for the first table is renamed to correspond to the temporary runtime object and the temporary data dictionary entry.

A runtime object, a database layer object, and a data dictionary entry for an append table are created. At least a portion of the append data is copied to the runtime object and the database layer object for the append table.

In a further aspect, a further method is provided for converting a table, including primary data and append data, from a first format to a second format. A first table in a first format is loaded into an update runtime environment. The first table has an associated entry in a database layer and an entry in a data dictionary. The first table incudes primary data and append data. The append data is associated with an entry in the data dictionary. At least a portion of the primary data is converted to a second format. The data in the second format is stored in a runtime object for the second table. The second table is associated with an entry in the data dictionary.

A temporary runtime object and a temporary data dictionary entry for the temporary runtime object are created. The database layer object for the first table is renamed, to correspond to the temporary runtime object and the temporary data dictionary entry. A runtime object, a database layer object, and a data dictionary entry for an append table are created. At least a portion of the append data is copied to the runtime object and the data layer object for the append table. Primary keys of the first table are copied to the append table. The database layer object for the first table is renamed to correspond to the second table. The temporary runtime object and the temporary data dictionary entry are deleted.

A first request to access data from the second table is received. The first request is joined with a second request to access data from the append data. Data from the table in the second format and data from the append table can be retrieved and returned in response to the first and second requests, such as by returning the data to a requesting application or user.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 9 is a diagram illustrating definitions of a primary table in a second format and an append table in the second format that can be produced using a disclosed conversion process from a table in a first format having primary data and append data, as well as logical views of the primary table and the append table.

FIG. 15 is a diagram of an example computing system in which some described embodiments can be implemented.

DETAILED DESCRIPTION

Example 1—Overview

Figure 1:
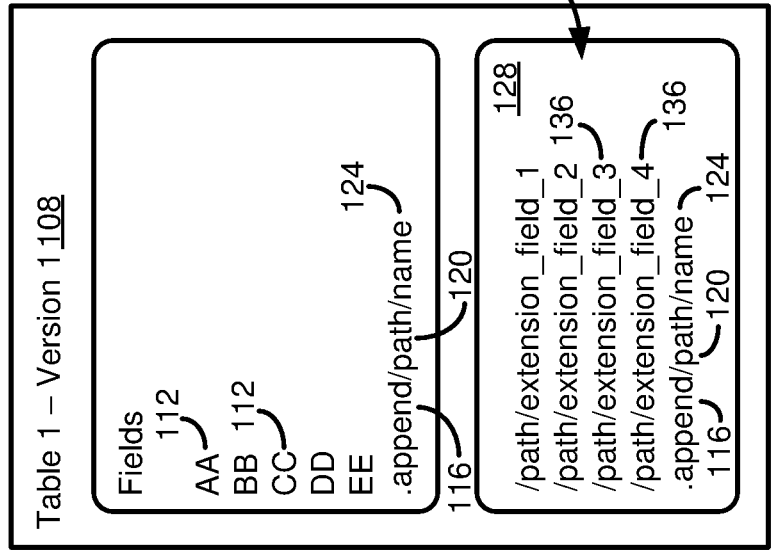
FIG. 1 is a diagram illustrating a definition of a table having primary data and append data, and a logical view of the table.

Software commonly is updated or upgraded over time. In some cases, changes are incremental, such that data used with an earlier version of a software application continues to be useable with a later, updated version of the software application. In other cases, changes to the application are significant enough that all or a portion of data for a prior version of the application is not useable with the later, updated version of the software application. Similar issues can arise when data is to be transitioned between different software applications, which may use data in different formats.

In some cases, a software vendor may create tools, such as a migration assistant or wizard, to convert data for use with a new or different software application. However, these tools are typically created for general use. If data differs from a standard, expected format, the data may be lost when the data is transferred. Or, even if the data is not lost, it may not be converted to the new format. If it is recognized that some data was not converted, it can be time consuming to manually convert the data into a new format. In addition, it may be time consuming to adapt a new software application to work with data that is not native to the application or converted using a migration assistant. Accordingly, room for improvement exists.

In particular cases, data used by an application may be stored in a particular format, such as in the form of database tables. Some applications provide for standard database tables. That is, the database tables may include standard fields that are expected to be used by many end users. However, some end users may have different needs than other users, and the standard table may not include all fields needed by a particular user.

Particular applications can anticipate that some end users may wish to add additional fields to standard database tables. For example, the ERP Central Component (ECC) of SAP SE of Walldorf, Germany, provides functionality for associating additional fields with standard database tables. In some cases, a software application may provide standard functionality, with a standard table schema being defined for use with such standard functionality. For instance, the standard table may include base fields that are used with the application. However, certain users of the software may have particular needs such that it is desirable to include additional fields in the table. In more particular cases, an add-on or plugin to a base software application may be available to extend the functionality of the base software application. The add-on or plugin may use the standard table, but may add additional fields to the standard table to support the extended functionality.

Some database environments, including at least certain products of SAP SE of Walldorf, Germany, provide for tables to be extended by including in a table definition a reference to an append, which can define additional fields for the table. However, when a software application is updated, including to accommodate a new database storage schema (e.g., column-store versus row-store), the new format may not support table appends. Or, even if appends are supported, a migration tool may not include functionality to migrate append data in addition to standard data (e.g., because the number of customizations or add-ons is such that it is impracticable to accommodate every different append structure that may exist).

With reference to FIG. 1, a table 108, representing a first version of a standard table (plus any customizations), can include a plurality of fields 112. These fields may be specified, for example, in a schema or data dictionary entry for the table 108. That is, the table 108 may have an identifier, and the identifier may be associated with a definition of the table, which definition can include the fields 112, and optionally other information. For example, the definition can include, or specify, a type, where a new table can be instantiated using a particular type.

The table 108 can include a customization, or extension, identifier 116. The customization identifier 116 can be used to determine that the table 108 has information in addition to the standard information (such as standard information, including fields, maintained in the schema for the table, where a schema and associated fields can be based on a particular type associated with the table). The customization identifier 116 can be associated with a location or path 120 where additional information associated with the (custom version) of the table 108 can be retrieved. The path can be a particular file path. The customization identifier 116 and path 120 can be associated with an identifier 124, or name, of a table or file 128 (including a file containing a table, or table elements) of the additional information 132 associated with the table 108.

The additional information 132 can be in the form of additional database fields 136. The additional information 132 can include other types of information, such as defining foreign keys for the table 108, including the fields 112 or any additional fields 136 of the additional information. The additional information 132 can also include help information, such as information to be displayed to a user when a user provides input requesting help with a particular field 112, 136.

When the table 108 is instantiated, a data dictionary entry for the table 108 can be read, including the fields 112. Based on the customization identifier 116, the additional information 132 to be appended to the information in the data dictionary entry for the table 108 can be retrieved. The fields 112 and additional information 132 can be used to instantiate the table 108, such as in a database layer and as a runtime object, which can have the structure (e.g., logical view) shown in table 140.

Figure 2:
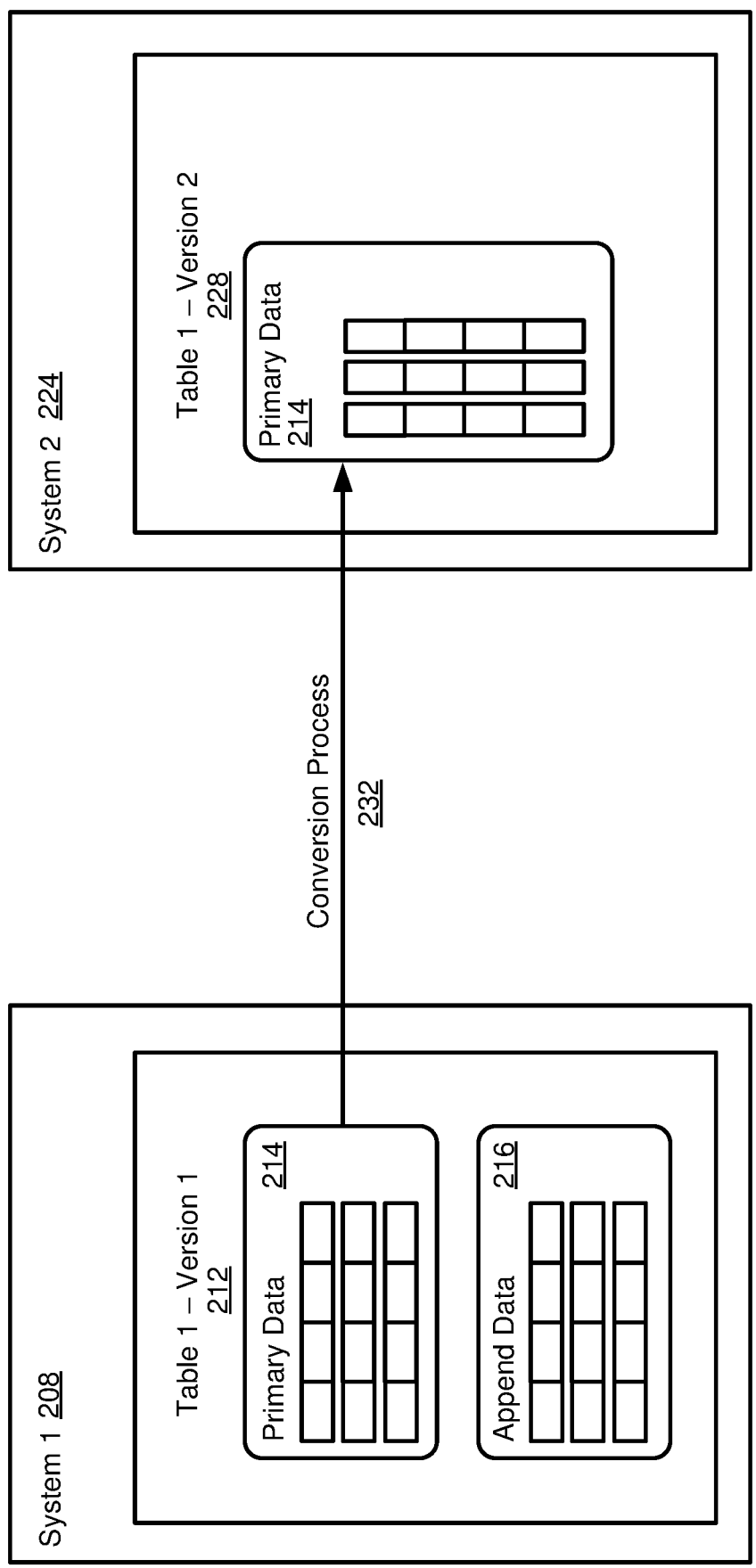
FIG. 2 is a diagram schematically depicting how data in a table append can be lost when converting a table, such as a standard table, from a first format to a second format.

FIG. 2 illustrates issues that can arise when converting a table having custom information, such as the table 108 and the additional information 132 of FIG. 1, to a new format, such as for use with a different software application. A first system 208 includes a first version 212 of Table 1. The first version 212 of Table 1 includes primary data 214 and append, or addition, data 216.

The primary data 214 and the append data 216 are shown in a first format. For example, the primary data 214 and the append data 216 may be maintained in a row store (e.g., table records are maintained, including in memory or in secondary storage, as sequential elements by row). Although shown separately, the primary data 214 and the append data 216 can be treated as a single table. For instance, the definitions for the primary data 214 and the append data 216 may be maintained separately in a data dictionary or other schema repository, but the first version 212 of Table 1 can have database layer (e.g., persistently stored) and runtime layer (e.g., in memory data that is manipulated or read by a software application) representations as a single object.

The first system 208 is shown as having data converted to a second system 224. In some cases, the first system 208 and the second system 224 can be unique systems (e.g., different physical hardware, or different logical representations in a cloud environment, for example). In other cases, the first system 208 and the second system 224 can represent the same system before and after a change in how data is maintained in the systems, such as in response to an update to a software application using the data, or a change to a different software application that uses a different data format.

In particular aspects, rather than row-based storage, the second system 224 can use column-based stored (e.g., tables are maintained, including in-memory or in secondary storage, as sequential elements by column) The first version 212 of Table 1 can be converted to a second version 228 of Table 1 by a conversion process 232.

The second version 228 of Table 1 is converted from a row-store format to a column-store format by the conversion process 232. The conversion process 232 can carry out various operations in converting the first version 212 of Table 1 to the second version 228. For example, the conversion process 232 can drop indices and aggregated tables that were created for, or with, the first version 212 of Table 1. The conversion process 232 can also compress data in the second version 228 of Table 1, such as using run-length encoding or dictionary compression. The conversion process 232 can also create new index structures for primary key fields, or full text indices for full text searching.

The update process 232 may only be defined for the primary data 214. For instance, if the update process 232 is configured to be a generic process for many users, the update process may not be written to account for particular differences between particular user data (e.g., data in the append table 216). Or, System 2 may not be configured to support append data 216, or similar modifications of, or additions to, the primary data 214. Accordingly, append data 216 may be lost when the conversion process 232 is carried out on the first version 212 of Table 1.

Figure 3:
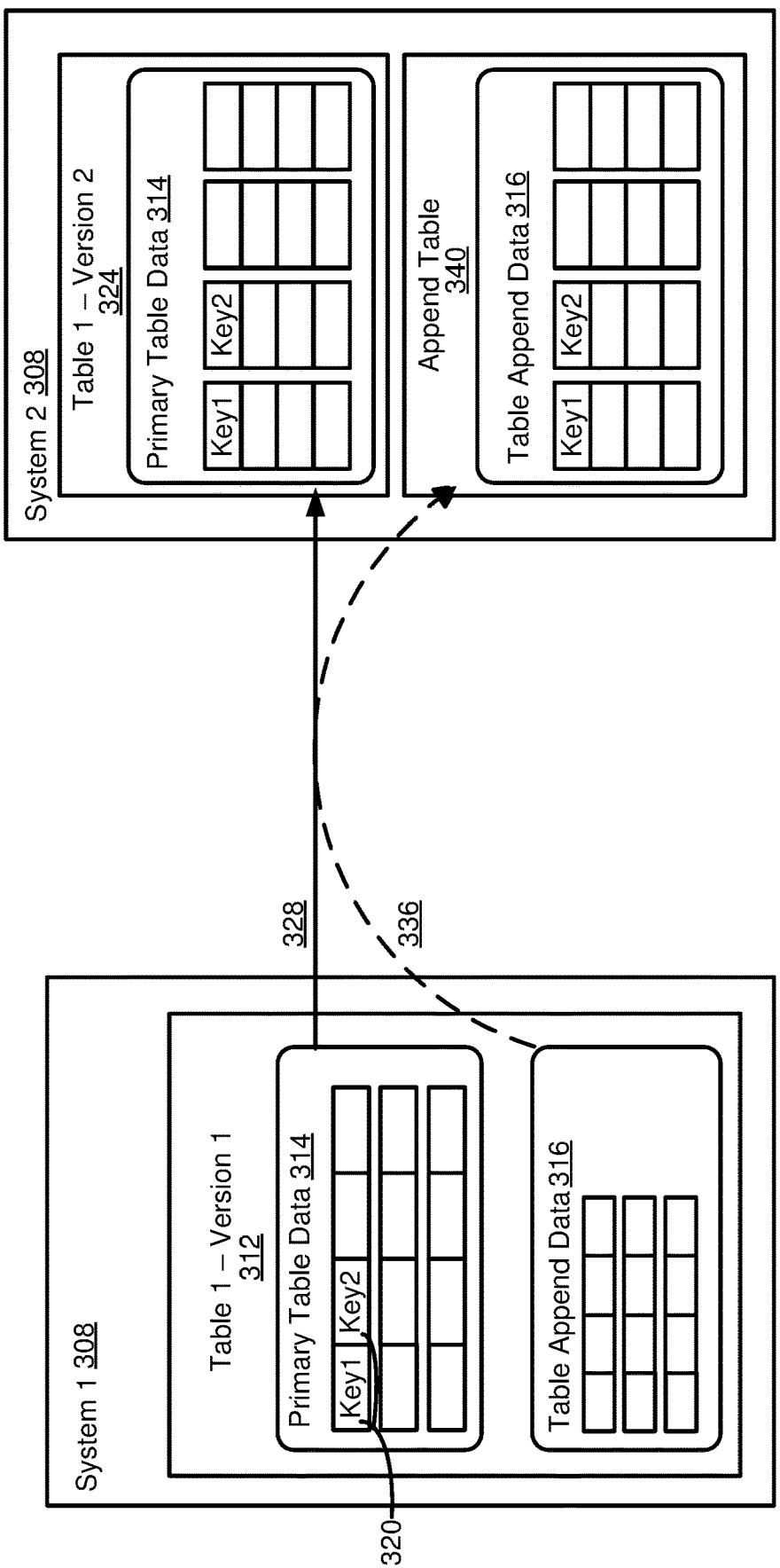
FIG. 3 is a diagram schematically depicting a table conversion process that can preserve append data, in a new append table, when converting a table with a table append from a first format to a second format.

FIG. 3 illustrates how disclosed technologies can provide data format update or conversion that preserves custom or non-standard data. FIG. 3 includes a first system 308 that includes a first version 312 of Table 1. The first version 312 of Table 1 includes primary data 314 and append data 316. The primary data 314 and the append data 316 can be analogous to the primary data 214 and the data 216 of FIG. 2. The primary data 314 can include one or more primary key fields 320.

The primary data 314 can be converted for a second version 324 of Table 1 using a conversion process 328. The conversion process 328 can be analogous to the conversion process 232 of FIG. 2. For example, the conversion process 328 can convert the primary data 314 from a row-store format to a column-store format in the second version 324 of Table 1.

Disclosed technologies can provide a supplemental conversion process 336 that can convert the append data 316 to a new append table 340 in the second system 308. The conversion process 336 can be integrated into the conversion process 328. Or, the supplemental conversion process 336 can be separate from the conversion process 328.

The append table 340 produced using the supplemental conversion process 336 can be independent of the second version 324 of Table 1. That is, the append table 340 can be independently specified in a data dictionary or database schema, and can be used alone or in conjunction with the second version 324 of Table 1. When used in conjunction, such as via a JOIN or database view, the second version 324 of Table 1 and the append table 340 can provide data equivalent to data in the first version 312 of Table 1. The append table 340 can include the primary key fields 320 of the primary data 314, so that retrieving data using a primary key will retrieve values from append table 340 and the second version 324 of Table 1 equivalent to data that would have been retrieved using the first version 312 of Table 1.

The append data 316 can be converted from a first format to a second format in an analogous manner to the primary data 314. For example, the data can be converted from a row-store format to a column-store format. In some cases, the conversion can be carried out using the supplemental conversion process 336. In other cases, the conversion can be carried out using the conversion process 328. For instance, the supplemental conversion process 336 can create a separate row-store table containing the append data 316. The conversion process 328 can then convert the row-store version of the append data 316 to the column-store append table 340.

The supplemental conversion process 336 can carry out additional actions. For example, the supplemental conversion process 336 can create a view that joins the second version 324 of Table 1 and the append table 340. The view can be equivalent to the data in the first version 312 of Table 1, except that the underlying data is maintained in two, separate tables in the new format (e.g., column-store).

The disclosed technologies can provide various advantages. For example, the disclosed technologies can provide a data conversion process that can adapt to the custom information of a particular user or organization so that such data is not lost. The conversion process can automatically adapt to the custom information, such that manual intervention, or manual creation of a custom conversion process, is not required. The disclosed technologies can facilitate upgrading data to new or different software, which can result in improved computing performance. For example, in at least certain scenarios, column-store data can be processed more efficiently than row-store data. By allowing for adaptive conversion, the disclosed technologies can facilitate data being converted to a more efficiently processed format (e.g., faster execution or lower resource use, such as lower CPU, memory, or network use), whereas otherwise a user or organization may have refrained from such conversion due to concerns of data loss or corruption, or the expense and effort of manually converting data or designing a custom conversion process.

Aspects of the present disclosure can transparently allow an application to access data in a new format, including accessing the data from multiple tables instead of from a single table. For instance, a view can be created that joins the second version 324 of Table 1 and the append table 340. Operations directed to the second version 324 of Table 1 can be redirected to the view, including transparently to an application or an end user. Or, the second version 324 of Table 1 can be renamed, and the view given the name of the second version of Table 1, such that the view will be used and operations directed to the second version of Table 1 will instead be processed, via the view, using the second version 324 of Table 1 (now renamed) and the append table 340.

Example 2—Example Conversion of Table with Append Data

Figure 4:
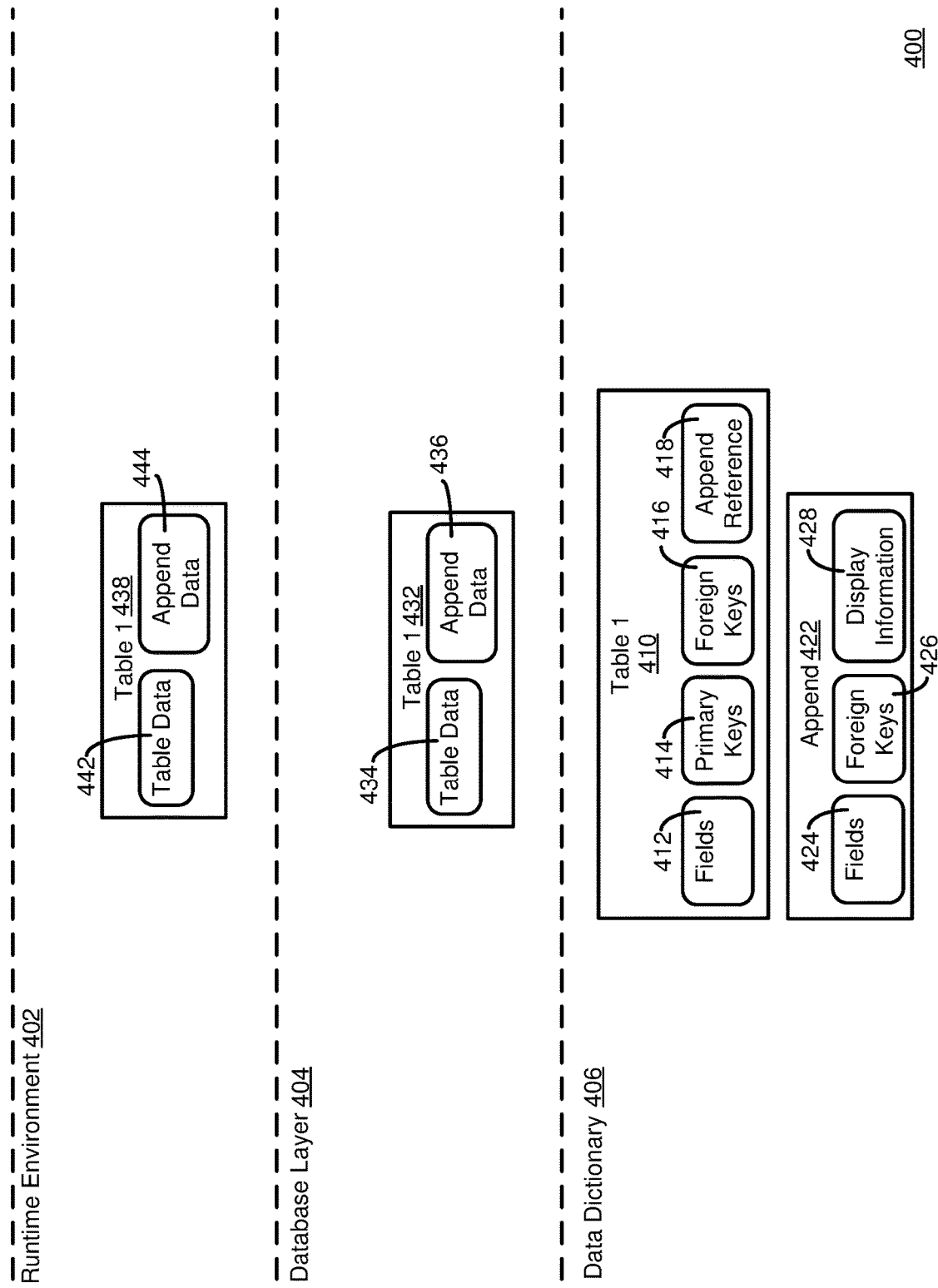
FIGS. 4-7 are diagrams schematically depicting a disclosed conversion process for converting a table with append data from a first format to a second format, where the append data is populated to an append table in the second format.

FIGS. 4-7 illustrate a process for converting data, such as in a database table, between formats. With reference to FIG. 4, a database environment 400 can include a runtime environment 402, a database layer 404, and a data dictionary or schema layer 406. A table can be represented in each of the layers 402, 404, 406. For example, a table (e.g., a table to be converted from a first format to a second format) can be defined in the data dictionary layer 406, such as by including a name or identifier for the table, field names and types for the table, primary key designations, and references for any fields that may serve as foreign keys. An object for the table in the database layer 404 can be a persisted version of the instantiated database table, including data populated into the table. An object for the table in the runtime environment 402 can be an in-memory version of the database table, or a version otherwise manipulable by a software application.

The data dictionary layer 406 includes an entry 410 for a first version of Table 1. The entry 410 includes definition of a structure of Table 1 (e.g., the identity of fields 412 in the table, primary key designations 414, foreign key references 416, and the like). The entry 410 also includes a reference 418 to an entry 422 in the data dictionary layer 406 for an append structure.

The append structure defined by the entry 422 can be a data object that is used with the entry 410 to create objects in the runtime layer 402 and the database layer 404, including objects corresponding to the table of entry 410. That is, objects in the database layer include data as defined by both the entry 410 and the entry 422. In some cases, each append is associated with a single table in the data dictionary 406. A single table, in particular aspects, can be associated with multiple append structures. In other embodiments, append structures can be associated with multiple database tables, or a table can have a single source of append or extension information. At least some of the tables in the database environment 400 need not have an associated append structure.

The entry 422 in the data dictionary layer 406 for the append can include identities of fields identifiers 424 for additional fields to be included in the database layer 404 and runtime layer 402 representations of Table 1, as well as foreign key references 426 (e.g., designating fields 424 or fields 412 as foreign keys and providing a reference to a table associated with the foreign key), and display information 428. The display information 428 can be, for example, help information to be displayed, including upon receipt of user input to display the help information. In a particular example, the display information 428 is associated with particular fields 424 or fields 412.

A database layer 404 object 432 corresponding to Table 1 includes table data 434 associated with the entry 410, and append data 436 associated with the entry 422. Similarly, a runtime layer 402 object 438 for Table 1 includes table data 442 associated with the entry 410 and append data 444 associated with the entry 422. The objects 432, 438 can be stored in a first format, such as a row-store format. Typically, data is the same between the object 432 and the object 438. However, the data can differ, such as if the object 438 is updated by an application and the changes have not yet been persisted in the object 432.

Figure 5:
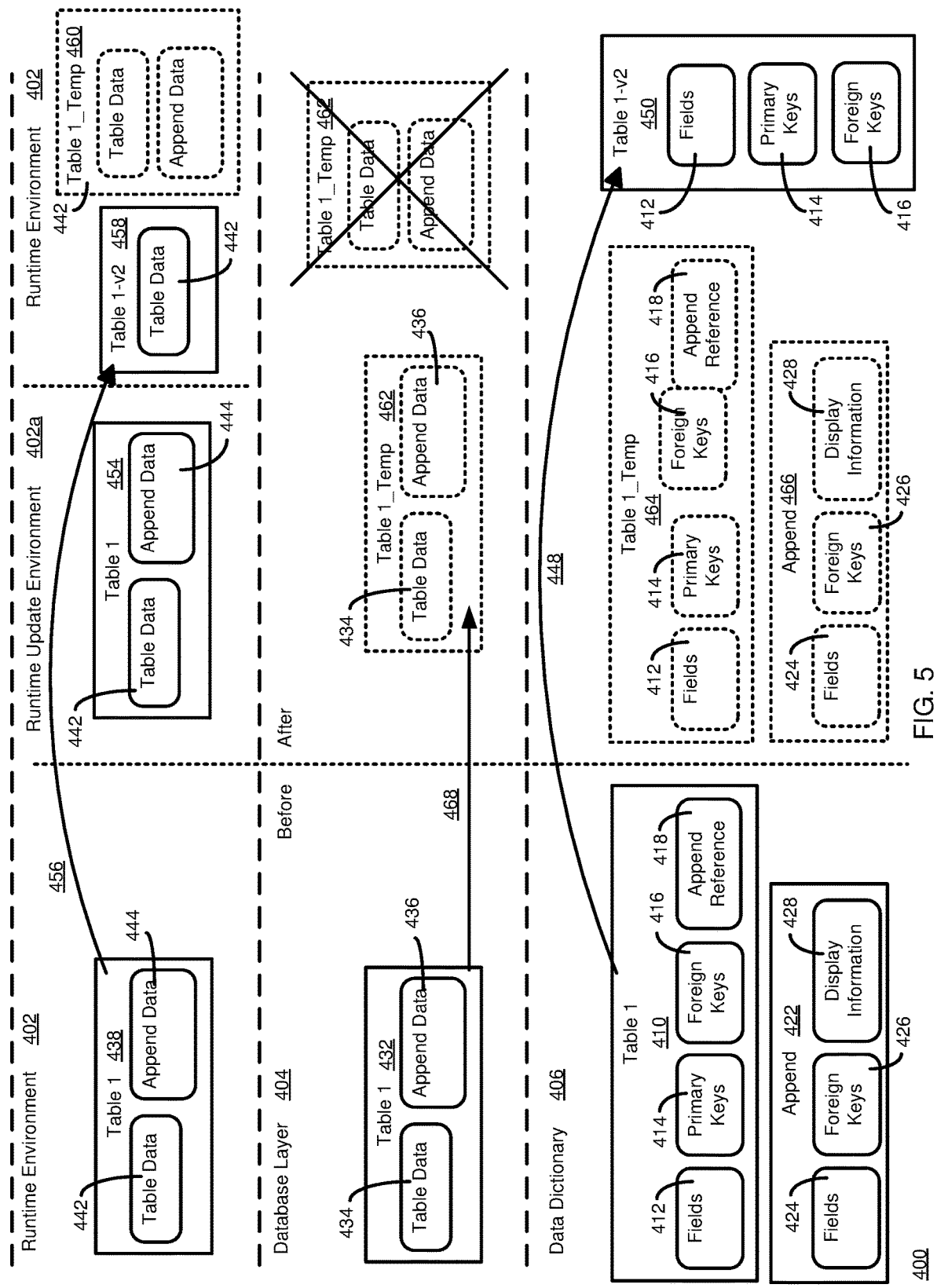

FIG. 4 illustrates the database environment prior to initiation of a conversion process. A first stage of a conversion process is illustrated in FIG. 5. In a conversion step 448, a data dictionary entry 450 in the data dictionary layer 406 can be created for a second version of Table 1. In some cases a data dictionary having the entry 450 can be the same as a data dictionary holding the entry 410, while in other cases the data dictionaries can be different. For example, when the data dictionaries are different, the data dictionaries can be associated with different database systems, including database systems located on different computing devices (or collections of computing devices) or the dictionaries can be located on different logical database systems of a cloud computing environment.

The entry 450 can include the fields 412, the primary key designations 414, and the foreign key references 416, which may be the same as in the entry 410 or different or updated. For example, if the names of other database tables change, such as a result of conversion, the foreign key references 416 can be correspondingly updated. Or fields 412 can be dropped as a result of a conversion or update. The entry 450 does not include the append reference 418.

In a conversion step 456, a runtime object 458 can be created from the runtime object 438 that includes the table data 442, but does not include the append data 444. In a conversion step, a runtime object 460, a database object 462, and a data dictionary entry 464 are created for a temporary version of Table 1 in the first format, which are to correspond to the data dictionary entries 410, 422. The objects 460, 462, 464 can be created from a runtime object 454 in an upgrade or update environment 402a (e.g., an environment that is used for upgrading tables, as opposed to, for example, an application runtime of an application configured to use the tables, such as an application used by end users). That is, the separate runtime environment 402a has an instance of the Table 1 in the first format (e.g., equivalent to the runtime object 438) that is not converted in process 456.

An entry 466 in the data dictionary can correspond to the append entry 422. Or, the entry 422 can be maintained in the data dictionary after the creation of the runtime objects 460, 462 and the entry 464.

The temporary runtime object 460, the database layer 404 object 462, and the data dictionary 406 entry 464 can be given names that distinguish them from the runtime object 458 and the database dictionary 406 entry 450, and can, more generally, disassociate the temporary runtime object 460 from one or more applications that are configured to use the runtime object 438. For example, the temporary runtime object 460 can be given a name that places it in a customer namespace, as opposed to a system or vendor namespace. For example, in products available from SAP SE of Walldorf, Germany, a customer namespace can include database objects (including tables, which can include data dictionary definitions of tables, runtime objects corresponding to the table, and a database layer instance of the table) that begin with the letters Y or Z.

At this point, the database environment 400 can have the database layer 404 object 432 that is consistent with the runtime object 454 in an upgrade or update environment 402a, and the temporary runtime object 460, but is inconsistent with the new runtime object 458 having the identifier (e.g., name) of Table 1. The temporary database layer 404 object 462 can be deleted. In a conversion step 468, the database layer 404 object 432 can be renamed (the renamed object 432 is indicated as 462) to correspond to the name given to the temporary runtime object 460 (e.g., a Z-version of the database layer object can be created).

After the database layer 404 object 432 is renamed, data can be retrieved from the object 462 (the renamed version of object 432) through the data dictionary entries 464, 466. As will be further described, the append data 436 (444) can be migrated to a new table, such that it is not lost after the runtime object 438 (and corresponding data dictionary layer 406 and database layer 404 components) are converted to the format of the runtime object 458.

Figure 6:
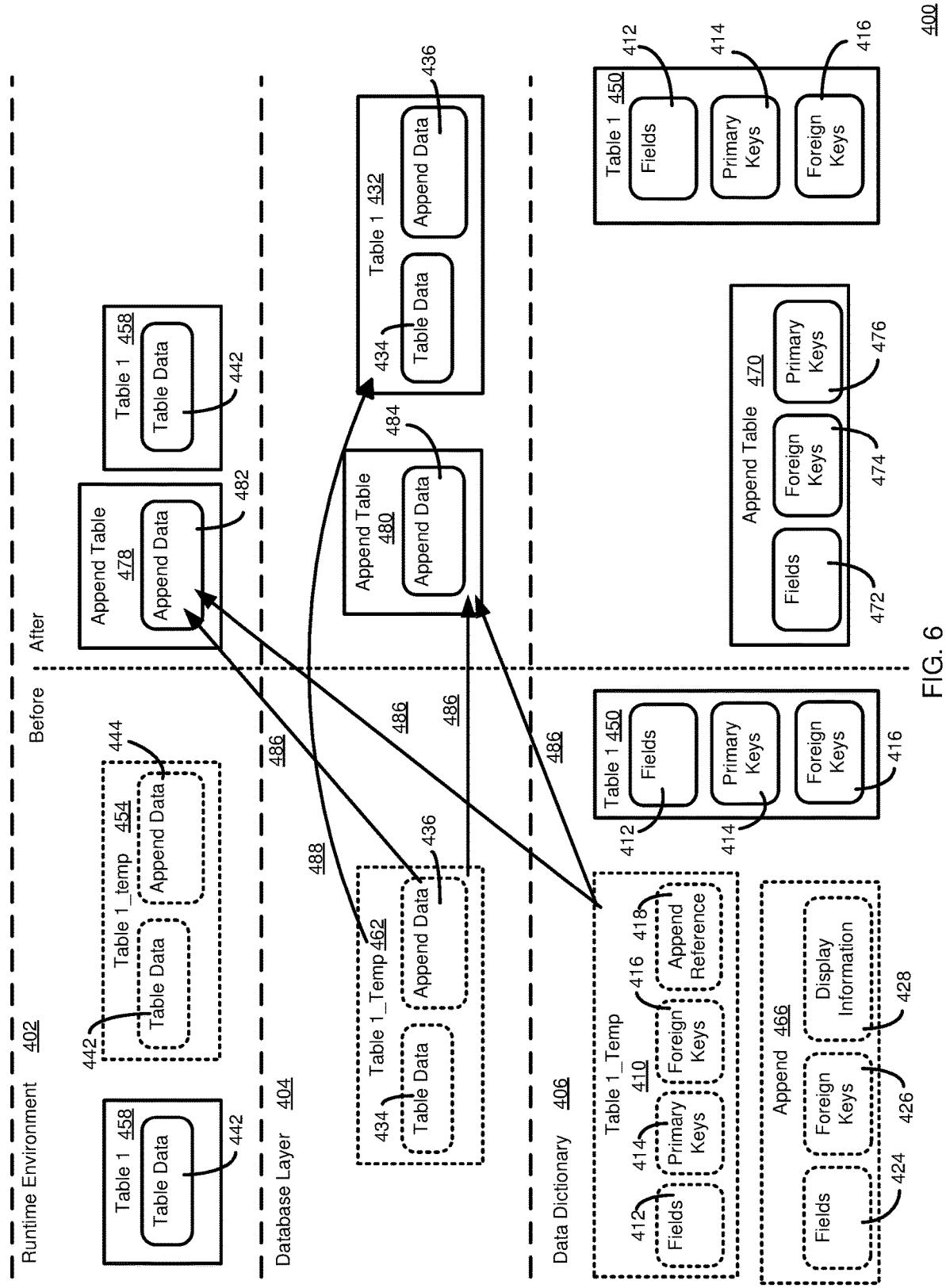

With reference to FIG. 6, an entry 470 can be created in the data dictionary layer 406 for a table, Append Table, corresponding to the append data 436 (444). The entry 470 can include data from the entry 466, including fields 472 that can include all or a portion of the fields 424, foreign keys 474 that include all or a portion of the foreign key information 426, and all or a portion of the display information 428 (not shown). However, the entry 470 can include additional data, including data from the entry 410 of FIG. 4 for the primary table, Table 1.

In particular, primary keys 476 of the entry 470 can include all or a portion of the primary keys 414, and the fields 472 can include the corresponding primary key fields from the fields 412. Including the primary keys 414 and the corresponding fields of the fields 412 in the entry 470 can allow the append table specified by the entry 470 to be used independently of, or in conjunction with, the updated version of Table 1 (e.g., corresponding to the runtime object 458, lacking the append data 444). From the entry 470, a runtime layer 402 object 478 and a database layer 404 object 480 can be created for the append table, having append data 482, 484, respectively, corresponding to the fields 472.

In a conversion step 486, data is migrated from the temporary database layer 404 object 462 to the runtime object 478 and the database layer object 480 for the append table. Migrating the data in the conversion step 486 can include converting the data between formats. For example, the data in the temporary database layer 404 object 462 can be maintained as a row-store, and can be converted to a column-store format in database layer object 478 and the runtime object 480. Such conversion can involve dropping indices and aggregate tables for the append data of the temporary runtime object 454 or the temporary database layer object 462, creating new indices for the runtime object 478 or the database layer object 480, and compressing the runtime object 478 or the database layer object 480.

Figure 7:
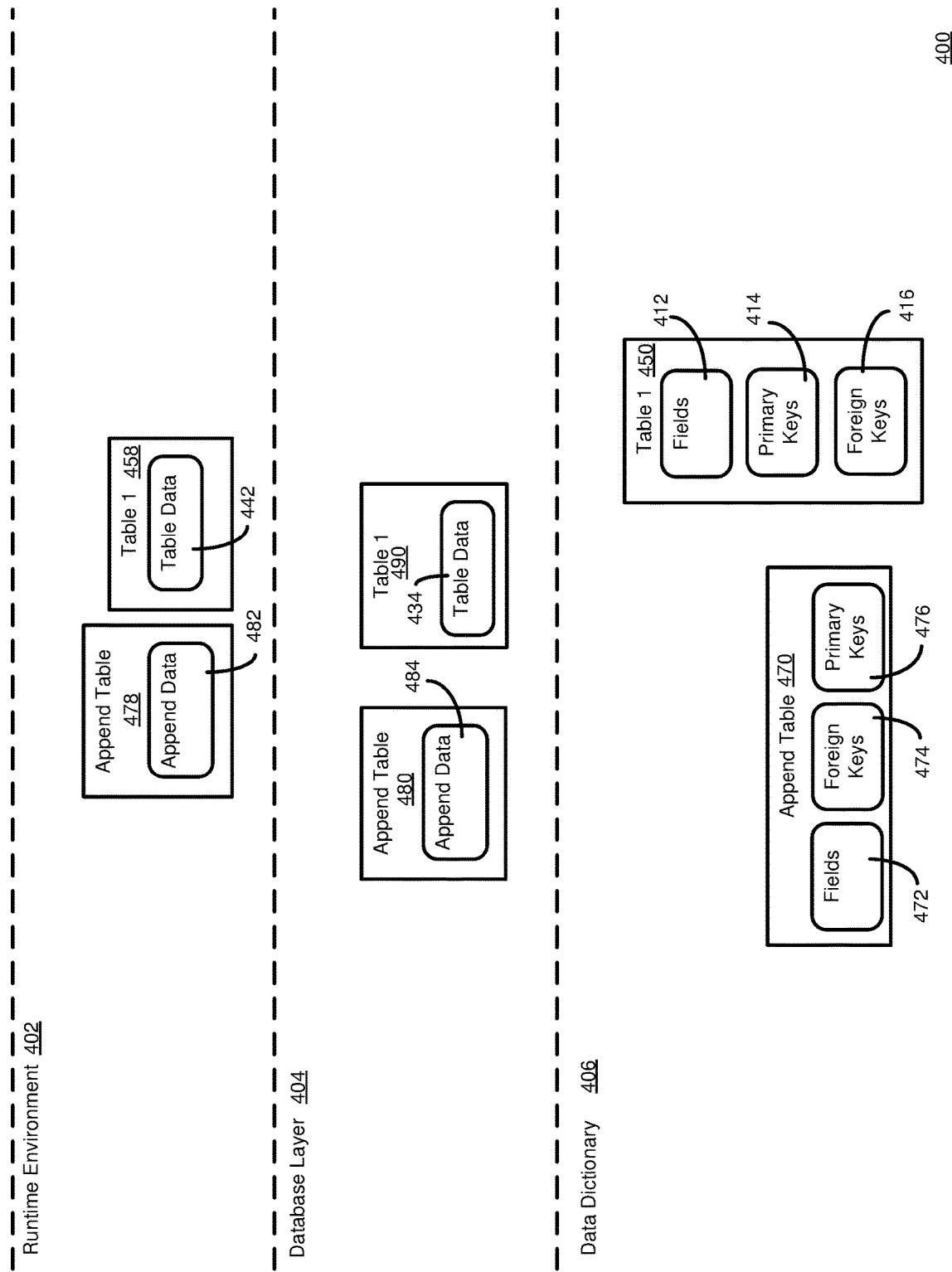

In a conversion step 488, the temporary database layer 404 object 462 can be renamed, to database layer object 432, to coincide with the runtime object 458 and the data dictionary entry 450 for Table 1 in the new format. The runtime object 458, database layer 404 object 432, and the data dictionary entry 450 can be activated, and checked for consistency. The consistency check can indicate that database layer 404 object 432 is inconsistent with the runtime object 458 and the data dictionary entry 450 (e.g., because it is in a different format and includes the append reference), and can convert the database layer object to a reformatted database layer 404 object 490, as shown in FIG. 7. After the data migration of step 486, the data dictionary entries 410, 466, and the runtime object 454, can be dropped, as shown in FIG. 7.

FIG. 7 shows the database environment after the conversion, with two runtime objects 458, 478 corresponding to the original table data 442 and append data 444, respectively, each with corresponding database layer 404 objects 490, 480, and data dictionary entries 450, 470.

Example 3—Example Operations for Converting Table with Append Data

Figure 8:
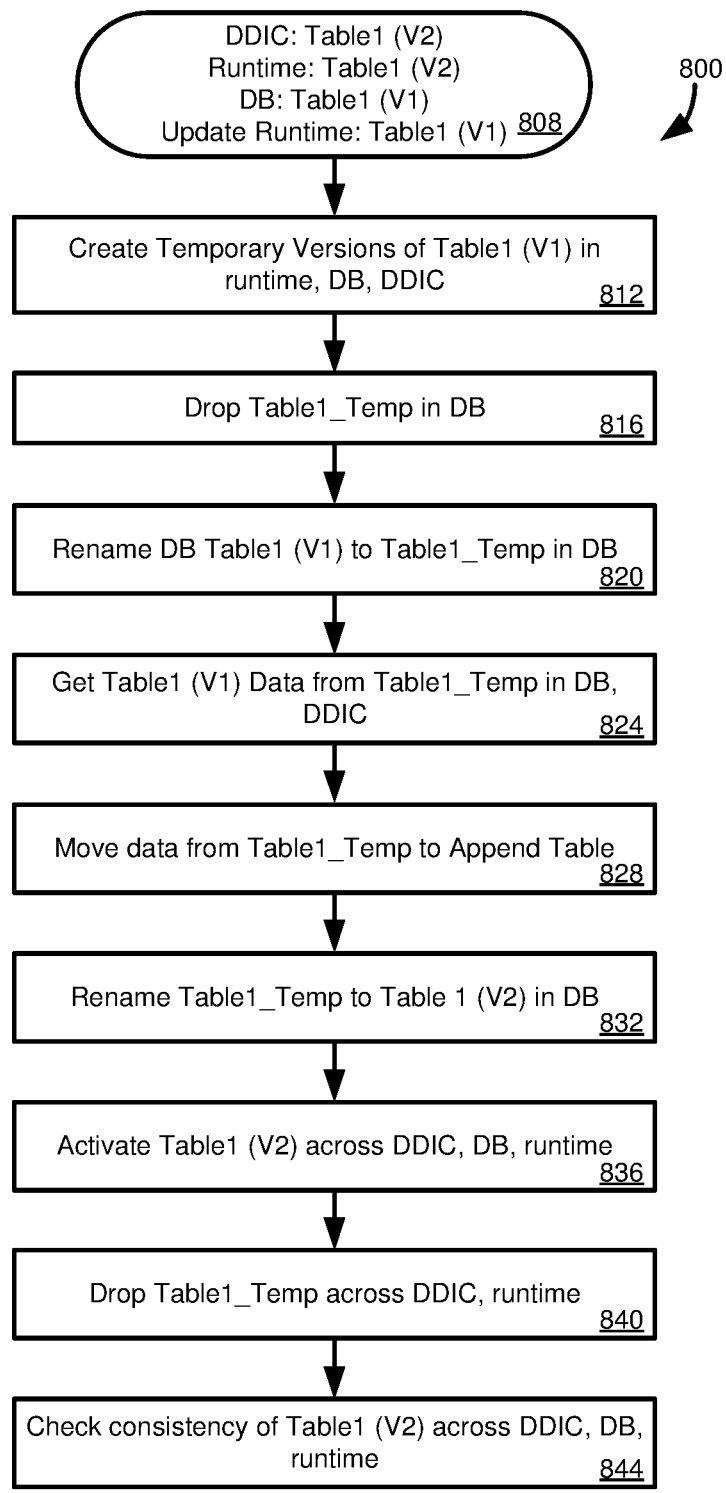
FIG. 8 is a flowchart illustrating operations in a disclosed conversion process for converting a table with append data from a first format to a second format, where the append data is populated to an append table in the second format.

FIG. 8 illustrates a flowchart of operations 800 that can be carried out in converting a table from a first format to a second format. The operations 800 can include the operations, and database environment objects (including data dictionary entries) described in Example 2. At the start 808 of the conversion, a data dictionary layer includes a second version of Table 1, a runtime environment includes a second version of Table 1, a database layer includes a first version of Table 1, and an update runtime environment includes a first version of Table 1. Temporary versions of the first version of Table 1 are created in the runtime environment, the database layer, and the data dictionary at 812. The temporary versions can be given names or identifiers that distinguish them from entries or objects associated with the second version of Table 1. At 816, the temporary version of the first version of Table 1 is dropped from the database layer.

The database layer object for the first version of Table 1 is renamed at 820 to coincide with the names of the temporary versions of the first version of table 1 in the data dictionary and the runtime environment. At 824, data from the first version of table 1 is obtained, such as using OpenSQL, from the temporary versions of the first version of table 1 in the database layer and the data dictionary. At least a portion of the retrieved data is moved (or copied), at 828, to runtime and database layer objects for an append table in the new format. For example, append data in the retrieved data can be moved or copied, as can at least certain fields of the primary data of Table 1, such as data for primary key fields.

At 832, the temporary version of the first version of Table 1 is renamed to a non-temporary name that corresponds to the names of the runtime object and data dictionary entry of the second version of Table 1. The second version of Table 1 is activated, at 836, across the data dictionary, database layer, and runtime environment. At 840, the temporary versions of the first version of Table 1 can be dropped across the data dictionary and runtime environments, and any objects or dictionary entries associated with the first version of Table 1 can be dropped from an update environment, including an update runtime environment.

The consistency of the runtime and database layer objects of the second version of Table 1, and the data dictionary entry for the second version of Table 1, can be checked for consistency at 844. The consistency check may determine, for example, that the database layer object for the second version of Table 1 does not match with the corresponding runtime object and data dictionary entry. The database layer object for the second version of Table 1 can then be updated to correspond to the associated runtime object and data dictionary entry.

Example 4—Example Tables Resulting from Conversion of Table with Append Data

FIG. 9 illustrates results of converting a table, such as the table 108 of FIG. 1, having primary data and append data to a new format, where an update or upgrade process preserves the append data. The update or upgrade process can be a process described in Examples 2 or Example 3.

The conversion process results in a table 908 that includes primary data 912 of a source (e.g., version of the table in a first format). The table 908 can have a representation 914, such as a logical representation. The primary data 912 includes the fields 112 of table 108 of FIG. 1.

The conversion process also results in an append table 916 that includes append data 920 of a source table (e.g., version of the table in a first format). The append table 916 can have a representation 924, such as a logical representation. The append table 916 includes the fields 136 of the append data 128 of the table 108 of FIG. 1. The append table 916 also includes fields 140 that correspond to a portion of the fields 112, which can be fields that serve as primary keys for the tables 108, 908, and can also serve as primary keys for the append table 916. Or the fields 140 can serve as foreign keys for the table 908.

The tables 908, 916 can be used to provide equivalent data to the table 108. Operations can be directed to access the tables 908, 916, such as by a JOIN condition. Or, the tables 908, 916 can be accessed by creating a JOIN view of the tables, which can be a materialized view.

Figure 10:
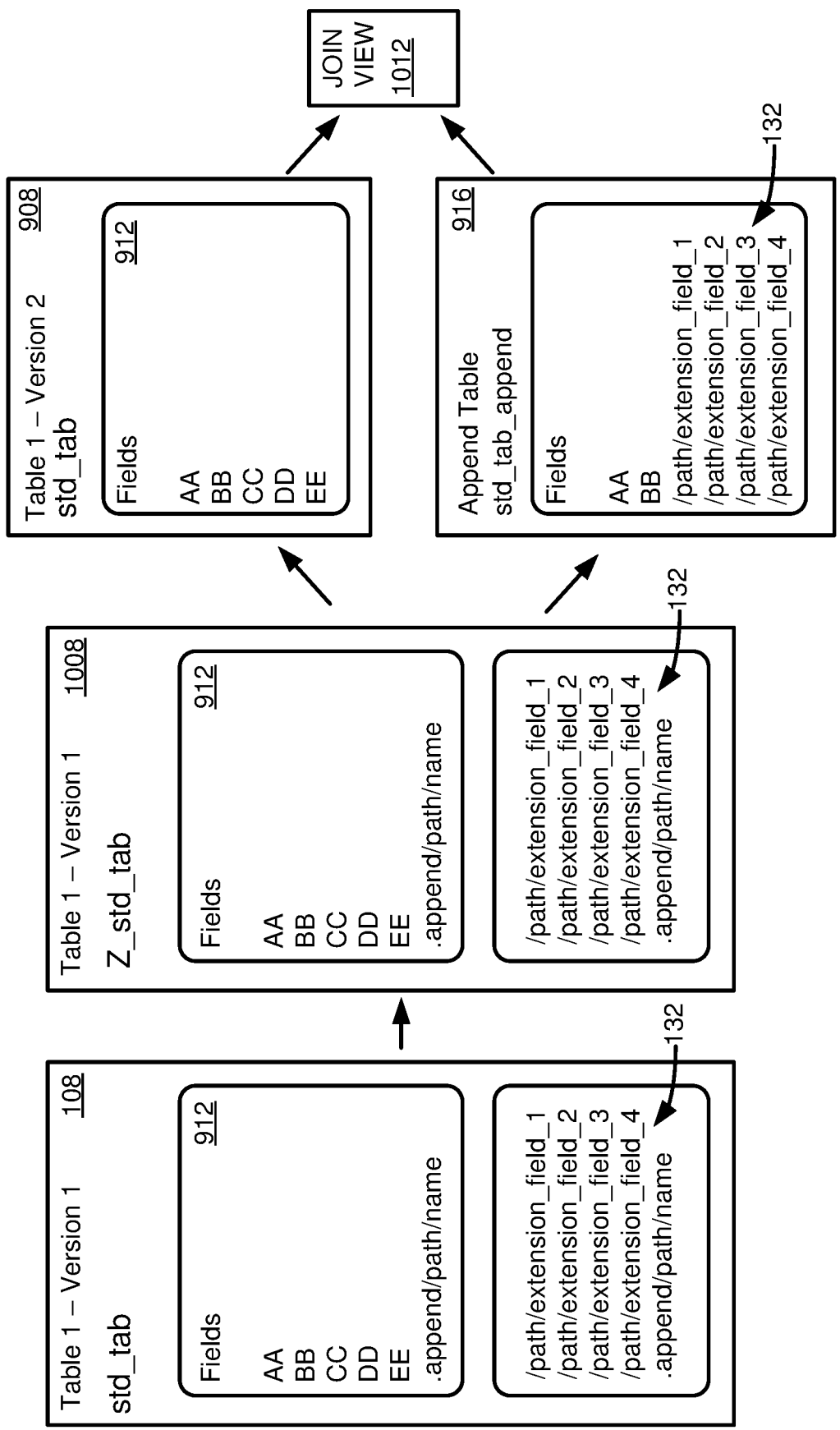
FIG. 10 is a diagram schematically depicting how fields of a table in a first format having primary data and append data can be migrated to a primary table in a second format and an append table in the second format using a runtime object corresponding to the table in the first format, and how a JOIN view can be used to access the primary table and the append data.

Example 5—Example Use of Database Layer Object to Convert Table with Append Data to Table in New Format and Append Table FIG. 10 illustrates a process of converting the table 108 of FIG. 1 to the tables 908, 916 of FIG. 9. The process can be the process described in Example 2 or Example 3Y.

FIG. 10 illustrates the table 108 prior to conversion. During conversion, a temporary runtime object 1008 (and a corresponding database layer object and data dictionary entry) is created, providing access to the append data 132. The table 908, with primary data 912, can be created directly from the table 108. The append table 916 can be created from the append data available in the runtime object 1008 (and corresponding database layer object and data dictionary example). The data in the tables 908, 916 can be accessed in an analogous manner as data in the table 108, such as by creating a materialized JOIN view 1012.

Example 6—Example Merging of Primary Data into Single Table in New Format, with Multiple Append Tables The conversion processes so far described have generally involved a single table, with append data, in a first format being converted to a single table in a new format and a single, separate append table in the new format. However, the disclosed techniques can be used in situations where multiple source tables, at least a portion of which have append data, are merged into a single table having primary data.

Figure 11:
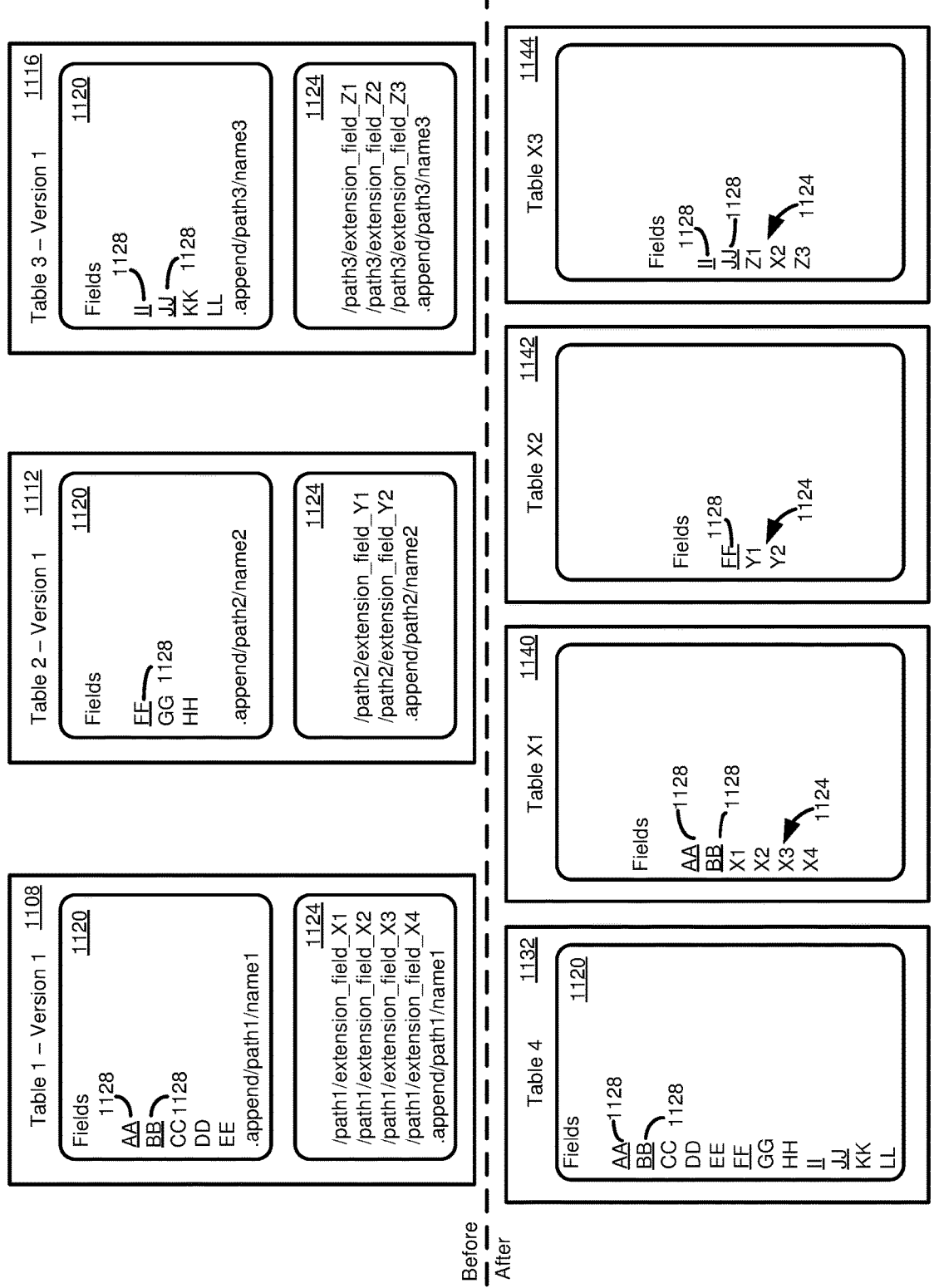
FIG. 11 is a diagram schematically depicting how multiple tables in a first format, each having primary data and append data, can be merged such that a primary table includes at least a portion of the primary data of the multiple tables and how at least a portion of the append data of each of the multiple tables is populated to separate append tables.

FIG. 11 illustrates a plurality of source tables 1108, 1112, 1116. Each source table 1108, 1112, 1116 has primary data 1120 and append data 1124. A portion of the primary data 1120 serves as primary keys 1128.

In a conversion process, which can be a conversion process described in Example 2 or 3, primary data from the source tables 1108, 1112, 1116 is merged into a single primary data table 1132 in the new format. As shown, the merged table 1132 includes all of the primary data 1120, including the primary keys 1128. However, in other cases, a portion of the primary data 1120, including primary keys 1128, can be excluded from the merged table 1132.

The append data for the source tables 1108, 1112, 1116 is moved to separate append tables 1140, 1142, 1144 after the conversion. Each append table 1140, 1142, 1144 has the append data 1124 from its respective source table 1108, 1112, 1116, as well as the primary keys 1128 from its respective source table. In other aspects, some of the append data 1124 can be omitted from an append table 1140, 1142, 1144.

Although FIG. 11 illustrates multiple source tables 1108, 1112, 1116 associated with append data 1124 in different appends, a similar situation can arise when a source table with multiple appends is converted to a new format. For instance, the source table 1108 could be associated with the appends specified in source tables 1112, 1116. When the source table 1108 is converted to the new format, some or all of the primary data 1120 can be included in the table 1132. The append data 1124, or a portion thereof, for each of the different appends could be moved into the different append tables 1140, 1142, 1144. In this scenario, typically, each append table 1140 incudes the primary keys from the source table 1108.

Example 7—Example Merging of Primary Table Data and Append Data

Example 6 described multiple source tables, having multiple appends, being converted to a merged primary data table, but having different append tables. However, in other aspects, when primary data is merged for multiple tables, their append data can also be merged into a merged append table.

Figure 12:
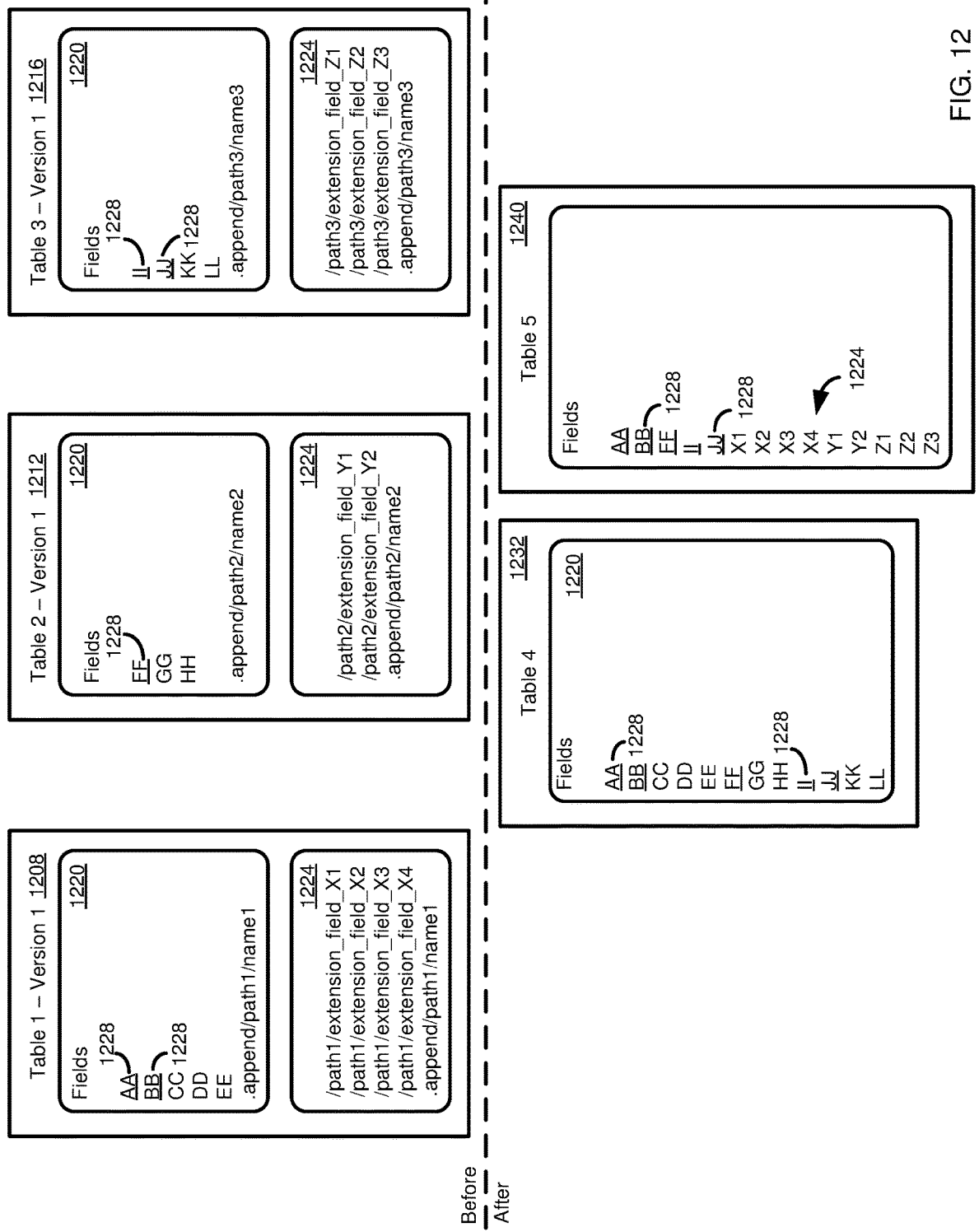
FIG. 12 is a diagram schematically depicting how multiple tables in a first format, each having primary data and append data, can be merged such that a primary table includes at least a portion of the primary data of the multiple tables and how an append table includes at least a portion of the append data of the multiple tables.

FIG. 12 illustrates a plurality of source tables 1208, 1212, 1216. Each source table 1208, 1212, 1216 has primary data 1220 and append data 1224. A portion of the primary data 1220 serves as primary keys 1228.

In a conversion process, which can be a conversion process described in Examples 2 or 3, primary data from the source tables 1208, 1212, 1216 is merged into a single primary data table 1232 in the new format. The merged table 1232 includes all of the primary data 1220, including the primary keys 1228. However, in other cases, a portion of the primary data 1220, including primary keys 1228, can be excluded from the merged table 1232.

The append data for the source tables 1208, 1212, 1216 is moved to a merged append table 1240. The merged append table 1240 has the append data 1224 from all of the source tables 1208, 1212, 1216, as well as the primary keys 1228 from the source tables. In other aspects, some of the append data 1224 can be omitted from the merged append table 1240.

Although FIG. 12 illustrates multiple source tables 1208, 1212, 1216 associated with append data 1224 in different appends, a similar situation can arise when a source table with multiple appends is converted to a new format. For instance, the source table 1208 could be associated with the appends specified in source tables 1212, 1216. When the source table 1208 is converted to the new format, some or all of the primary data 1220 can be included in the table 1232. The append data 1224, or a portion thereof, for each of the different appends could be moved into the merged append table 1240.

Example 8—Example Computing Environment

Figure 13:
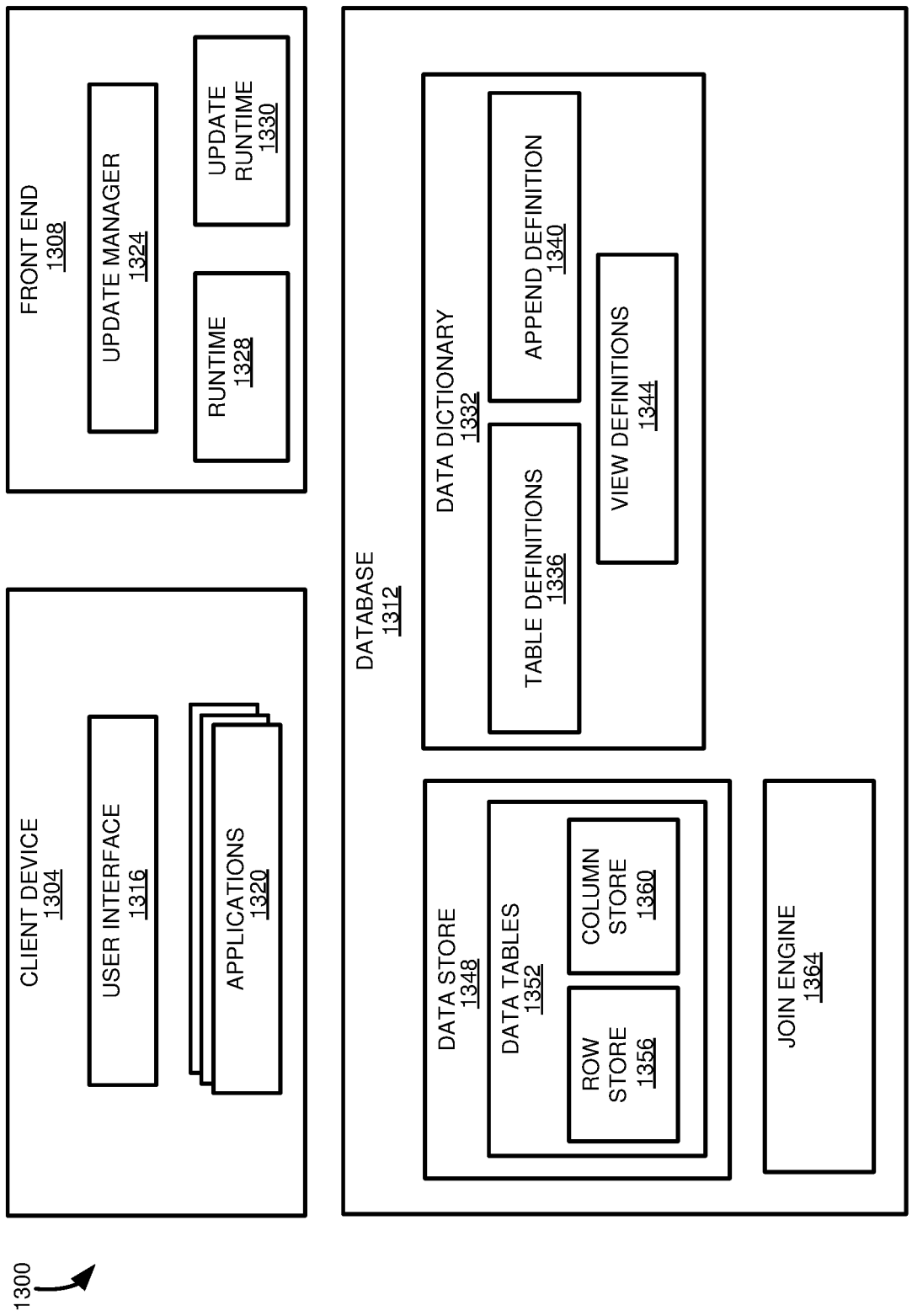
FIG. 13 is a block diagram of a computing environment in which disclosed technologies can be implemented.

FIG. 13 presents an example computing environment 1300 in which disclosed technologies can be implemented, including the conversion process described in Examples 2 or 3. The computing environment 1300 include a client device 1304, a front end 1308, and a database system 1312.

The client device 1304 can include a user interface 1316 and one or more applications 1320. In some aspects, the applications 1320 can provide user interfaces, in which case the user interface 1316 can be omitted. Or, the user interface 1316 can represent operating system or framework components that work in conjunction with user interface elements of the applications 1320. The applications 1320 can request services of the database system 1312. In some aspects, the applications 1320 interact with the database system 1312 through the front end 1308. However, in some scenarios, the applications 1320 can interact directly with the database system 1312.

The front end 1308 can include an update manager 1324. The update manager 1324 can be configured to manage an update process for updating tables from a first format to a second format. The update manager 1324 can access a runtime environment 1328, which can be used for processing database requests by the applications 1320. The update manager 1324 can also access an update runtime environment 1330, which may be a runtime environment used in converting tables, including tables represented in the runtime environment 1328, from a first format to a second format.

The front end 1308, and, in particular, the update manager 1324, can access the database system 1312. The database system 1312 can include a data dictionary 1332. The data dictionary 1332 can store definitions and schemas of database objects, include table definitions 1336, append definitions 1340, and view definitions 1344. Data associated with objects defined in the data dictionary 1332 can be stored in a data store 1348, which can contain database tables 1352.

The database tables 1352 can be maintained in different formats, including in row-store format in a row store 1356 and in a column-store format in column store 1360. The tables 1352 can include primary data, specified by a table definition 1336, and append data, specified by an append definition 1340.

Data from objects in the data store 1348, including from database tables 1352, can be processed using a JOIN engine 1364. For example, the JOIN engine 1364 can select data from a table 1352 with primary data and from a table 1352 with append data.

The computing environment 1300 is provided by way of example only, and the disclosed technologies are not limited to any particular computing environment, unless otherwise specified in the claims. In particular, functionality of components of the computing environment 1300 may be arranged differently than shown. For example, in some cases, the runtime environment 1328 or the update runtime environment 1330 can be implemented in the database system 1312.

Example 9—Example Data Conversion Operations

Figure 14A:
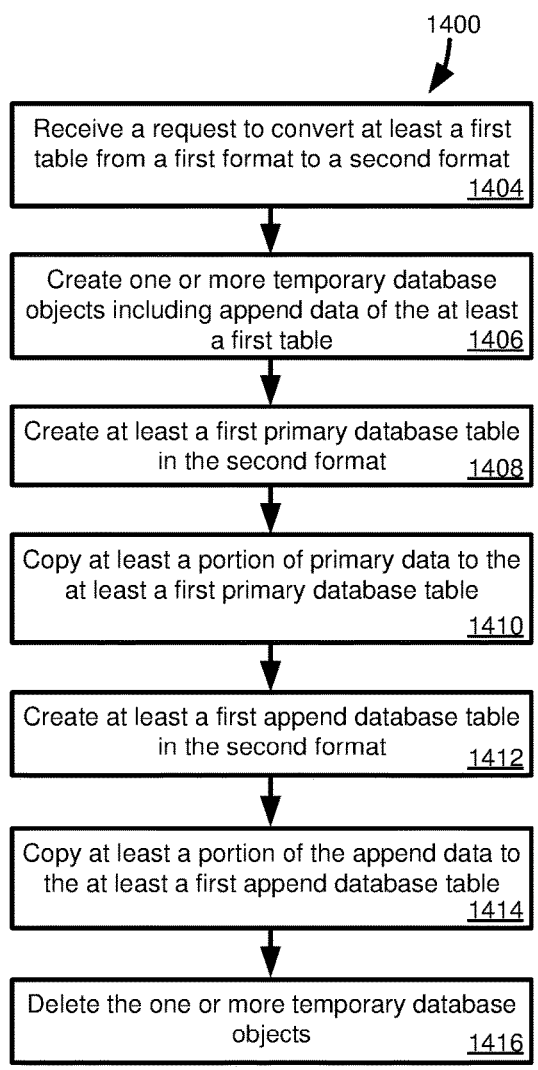
FIGS. 14A-14C are flowcharts illustrating operations in various embodiments of methods for converting a table in a first format, having primary data and append data, to a table in a second format, having at least a portion of the primary data, and an append table in the second format, having at least a portion of the append data.

FIG. 14A illustrates a method 1400 for converting a table having primary data and append data from a first format to a second format. The method 1400 can be carried out, in some examples, using the computing environment 1300 of FIG. 13. At 1402, a request is received to convert at least a first table from a first format to a second format. The at least a first table in the first format includes primary data and append data. The at least a first table in the second format includes at least a portion of the primary data. One more temporary database objects including the append data are created at 1404. At 1406, at least a first primary database table is created in the second format. At least a portion of the primary data is copied to the at least a first primary database table at 1408. At 1410, at least a first append database table is created, in the second format. At least a portion of the append data is copied to the at least a first append database table at 1412. The one or more temporary database objects are deleted at 1414.

Figure 14B:
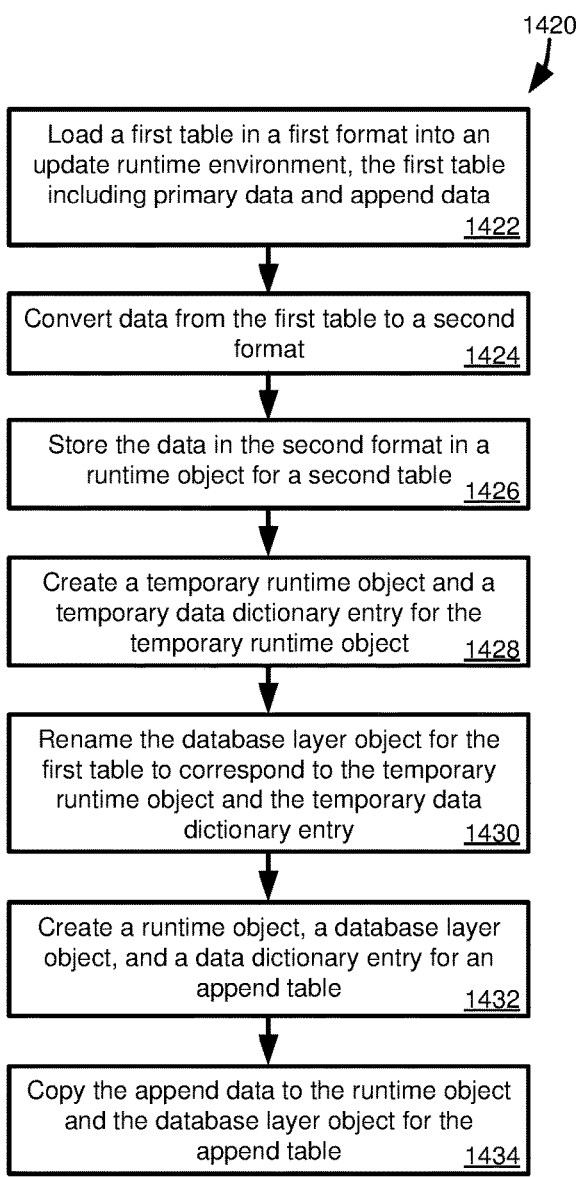

FIG. 14B illustrates a method 1420 for converting a table having primary data and append data from a first format to a second format. The method 1420 can be carried out, for example, in the computing environment 1300 of FIG. 13. At 1422, a first table is loaded into an update runtime environment. The first table has an associated object in a database layer and an entry in a data dictionary. The first table includes primary data and append data. The append data is associated with an entry in the data dictionary.

At least a portion of primary data from the first table is converted to a second format at 1424. At 1426, data in the second format is stored in a runtime object for a second table. The second table is associated with an entry in the data dictionary. A temporary runtime object and a temporary data dictionary entry for the temporary runtime object are created at 1428. At 1430, the database layer object for the first table is renamed to correspond to the temporary runtime object and the temporary data dictionary entry.

A runtime object, a database layer object, and a data dictionary entry for an append table are created at 1432. At 1434, at least a portion of the append data is copied to the runtime object and the database layer object for the append table.

Figure 14C:
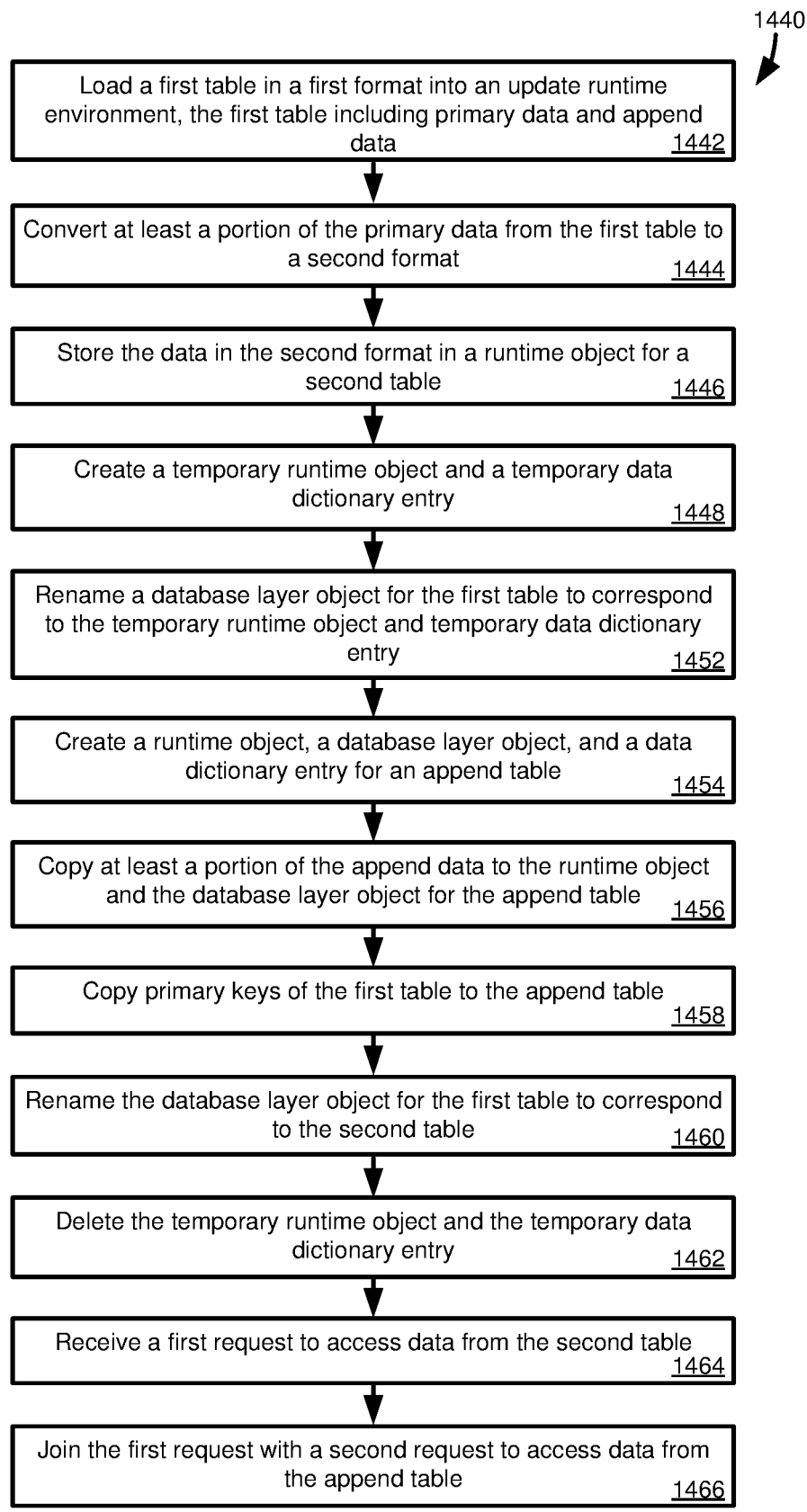

FIG. 14C illustrates a further method 1440, for converting a table, including primary data and append data, from a first format to a second format. The method 1440 can be carried out using, for example, the computing environment 1300 of FIG. 13.

At 1442, a first table in a first format is loaded into an update runtime environment. The first table has an associated entry in a database layer and an entry in a data dictionary. The first table includes primary data and append data. The append data is associated with an entry in the data dictionary. At least a portion of the primary data is converted to a second format at 1444. The data in the second format is stored, at 1446, in a runtime object for the second table. The second table is associated with an entry in the data dictionary.

At 1448, a temporary runtime object and a temporary data dictionary entry for the temporary runtime object are created (and, in at least some aspects, can be based at least in part on objects in an upgrade runtime environment). The database layer object for the first table is renamed, at 1452, to correspond to the temporary runtime object and the temporary data dictionary entry. At 1454, a runtime object, a database layer object, and a data dictionary entry for an append table are created. In various aspects, the objects created at 1454 can be created after 1452, or at another time, such as prior to initiation of an update process or at an earlier time in an update process.

At least a portion of the append data is copied (such as from objects in an upgrade runtime environment), at 1456, to the runtime object and the data layer object for the append table. Primary keys of the first table are copied to the append table at 1458. At 1460, the database layer object for the first table is renamed to correspond to the second table. The temporary runtime object and the temporary data dictionary entry are deleted at 1462.

A first request to access data from the second table is received at 1464. The first request is joined, at 1466, with a second request to access data from the append data. Data from the table in the second format and append data from the append table can be retrieved and returned in response to the first and second request, such as by returning the data to a requesting application or user.

Example 10—Computing Systems

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing any of Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 may have additional features. For example, the computing system 1500 includes storage 1540, one or more input devices 1550, one or more output devices 1560, and one or more communication connections 1570, including input devices, output devices, and communication connections for interacting with a user. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing system 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality.

Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 16:
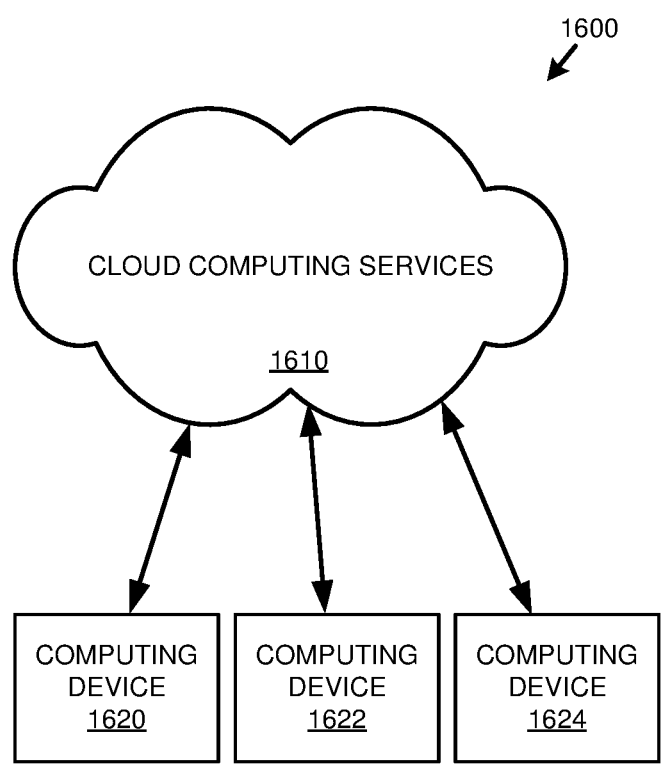
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operations (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media storing computer-executable instructions for causing a computing system, the computing system comprising one or more processing units and one or more memories, when programmed thereby to perform operations for converting a database table with append data between formats, the operations comprising:

receiving a request to convert at least a first table from a first format to a second format, the at least a first table in the first format comprising primary data and append data, the at least a first table in the second format comprising at least a portion of the primary data;

creating one or more temporary database objects comprising the append data;

creating at least a first primary database table in the second format;

copying at least a portion of the primary data to the at least a first primary database table;

creating at least a first append database table in the second format;

copying at least a portion of the append data to the at least a first append database table; and deleting the one or more temporary database objects.

2. The one or more computer-readable storage media of claim 1, wherein the table in the first format is specified in a first data dictionary entry and a second data dictionary entry specifies fields associated with the append data.

3. The one or more computer-readable storage media of claim 2, wherein the first data dictionary entry comprises a reference to the second data dictionary entry.

4. The one or more computer-readable storage media of claim 3, wherein the converting takes place in a computing environment comprising a runtime environment and an upgrade runtime environment, the upgrade runtime environment comprising a runtime object corresponding to the table in the first format, the runtime environment comprising a runtime object corresponding to the table in the second format.

5. The one or more computer-readable storage media of claim 1, wherein the table in the second format does not comprise the append data.

6. The one or more computer-readable storage media of claim 1, wherein data associated with the table in the first format is maintained in a row-store and data for the table in the second format is maintained in a column-store.

7. The one or more computer-readable storage media of claim 4, wherein the temporary database objects comprise a data dictionary entry corresponding to the table in the first format and a runtime object in the runtime environment corresponding to the table in the first format.

8. The one or more computer-readable storage media of claim 7, wherein a database layer associated with the runtime environment and the update runtime environment comprise a table corresponding to the table in the first format and do not contain a table corresponding to the table in the second format.

9. The one or more computer-readable storage media of claim 8, further comprising renaming the table of the database layer to be associated with the temporary database objects.

10. The one or more computer-readable storage media of claim 9, wherein, after copying the append data to the append database table, renaming the table of the database layer to correspond to the table in the second format.

11. The one or more computer-readable storage media of claim 10, further comprising, after the renaming the table of the database layer to correspond to the table in the second format, comparing the database table of the database layer corresponding to the table in the second format to the runtime object corresponding to the table in the second format and a data dictionary entry corresponding to the table in the second format.

12. The one or more computer-readable storage media of claim 11, further comprising, based on the comparing:

determining that the table of the database layer corresponding to the table in the second format is inconsistent with the runtime object corresponding to the table in the second format; and updating the table of the database layer corresponding to the table in the second format to comprise data of the runtime object corresponding to the table in the second format.

13. The one or more computer-readable storage media of claim 1, wherein the append table comprises one or more primary key fields of the database table in the first format.

14. The one or more computer-readable storage media of claim 1, further comprising:

receiving a request to convert at least a second table from the first format to the second format, the at least a second table in the first format comprising primary data and append data; and copying at least a portion of the primary data of the at least a second table in the first format to the at least a first primary database table in the second format.

15. The one or more computer-readable storage media of claim 14, further comprising:

copying at least a portion of append data for the at least a second table in the first format to the at least a first append table in the second format.

16. The one or more computer-readable storage media of claim 14, further comprising:

copying at least a portion of append data for the at least a second table in the first format to at least a second append table in the second format.

17. The one or more computer-readable storage media of claim 1, wherein the append data comprises at least one database field.

18. The one or more computer-readable storage media of claim 1, wherein the append data is not represented as a separate database table in the first format.

19. A computing system that implements a table conversion service, the computing system comprising:

one or more memories;

one or more processing units coupled to the one or more memories; and one or more non-transitory computer readable storage media storing instructions that, when loaded into the memory, cause the one or more processing units to perform operations for:

loading a first table in a first format into an update runtime environment, the first table having an associated object in a database layer and an entry in a data dictionary, wherein the first table comprises primary data and append data, the append data associated with an entry in the data dictionary;

converting at least a portion of the primary data from the first table to a second format;

storing the data in the second format in a runtime object for a second table, the second table associated with an entry in the data dictionary;

creating a temporary runtime object and a temporary data dictionary entry for the temporary runtime object;

renaming the database layer object for the first table to correspond to the temporary runtime object and the temporary data dictionary entry;

creating a runtime object, a database layer object, and a data dictionary entry for an append table; and copying at least a portion of the append data to the runtime object and the database layer object for the append table.

20. In a computing environment, a method comprising:

loading an instance of a first table in a first format into an update runtime environment, the first table having an associated object in a database layer and an entry in a data dictionary, wherein the first table comprises primary data and append data, the append data associated with an entry in the data dictionary;

converting at least a portion of the primary data from an instance of the first table in a runtime environment to a second format;

storing the data in the second format in a runtime object for a second table, the second table associated with an entry in the data dictionary;

creating a temporary runtime object and a temporary data dictionary entry for the temporary runtime object;

renaming the database layer object for the first table to correspond to the temporary runtime object and the temporary data dictionary entry;

creating a runtime object, a database layer object, and a data dictionary entry for an append table;

copying at least a portion of the append data to the runtime object and the database layer object for the append table;

copying at least a portion of primary keys of the first table to the append table;

renaming the database layer object for the first table to correspond to the second table;

deleting the temporary runtime object and the temporary data dictionary entry;

receiving a first request to access data from the second table; and joining the first request with a second request to access data from the append data.

* * * * *